US011978968B1

(12) United States Patent
Wang et al.

(10) Patent No.: US 11,978,968 B1
(45) Date of Patent: *May 7, 2024

(54) 5G ULTRA-WIDEBAND DIPOLE ANTENNA

(71) Applicant: Airgain, Inc., San Diego, CA (US)

(72) Inventors: Daniel Wang, Sydney (AU); Peisheng Qian, Zhang Jia Gang (CN)

(73) Assignee: Airgain, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,539

(22) Filed: Jul. 20, 2023

Related U.S. Application Data

(63) Continuation of application No. 17/359,779, filed on Jun. 28, 2021, now Pat. No. 11,757,186.

(60) Provisional application No. 63/047,242, filed on Jul. 1, 2020.

(51) Int. Cl.

| | |
|---|---|
| ***H01Q 1/24*** | (2006.01) |
| ***H01Q 5/335*** | (2015.01) |
| ***H01Q 9/30*** | (2006.01) |
| ***H01Q 21/00*** | (2006.01) |
| ***H01Q 21/06*** | (2006.01) |

(52) U.S. Cl.
CPC ............. *H01Q 5/335* (2015.01); *H01Q 1/243* (2013.01); *H01Q 9/30* (2013.01); *H01Q 21/0043* (2013.01); *H01Q 21/064* (2013.01)

(58) Field of Classification Search
CPC .......... H01Q 5/335; H01Q 1/243; H01Q 9/30; H01Q 21/0043; H01Q 21/064
See application file for complete search history.

(56) References Cited

U.S. PATENT DOCUMENTS

| | | | | |
|---|---|---|---|---|
| D418,142 | S | 12/1999 | Thill | |
| 6,087,990 | A | 7/2000 | Thill et al. | |
| 6,559,809 | B1 * | 5/2003 | Mohammadian ........ | H01Q 9/16 343/702 |
| 6,850,191 | B1 | 2/2005 | Thill et al. | |
| 7,061,437 | B2 | 6/2006 | Lin et al. | |
| 7,148,849 | B2 | 12/2006 | Lin | |
| 7,215,296 | B2 | 5/2007 | Abramov et al. | |
| D546,821 | S | 7/2007 | Oliver | |
| D549,696 | S | 8/2007 | Oshima et al. | |
| 7,327,327 | B2 | 2/2008 | Wong et al. | |
| 7,333,067 | B2 | 2/2008 | Hung et al. | |
| 7,336,959 | B2 | 2/2008 | Khitrik et al. | |
| D573,589 | S | 7/2008 | Montgomery et al. | |
| 7,405,704 | B1 | 8/2008 | Lin et al. | |
| 7,477,195 | B2 | 1/2009 | Vance | |

(Continued)

OTHER PUBLICATIONS

International Search Report and Written Opinion for PCT Application No. PCT/US2021/039308, mailed on Oct. 18, 2021.

(Continued)

*Primary Examiner* — Hai V Tran
*Assistant Examiner* — Michael M Bouizza
(74) *Attorney, Agent, or Firm* — Clause Eight; Michael Catania

(57) ABSTRACT

An ultra-wide band dipole antenna assembly for transmitting or receiving electromagnetic signals is disclosed herein. The antenna assembly comprises a dipole antenna element and coplanar waveguide feeding network. The dipole antenna delivers the ultra-wide band matching through a pre-determined arrangement after the coplanar waveguide feeding network is applied.

20 Claims, 3 Drawing Sheets

(56) References Cited

U.S. PATENT DOCUMENTS

| | | | |
|---|---|---|---|
| D592,195 | S | 5/2009 | Wu et al. |
| 7,570,215 | B2 | 8/2009 | Abramov et al. |
| D599,334 | S | 9/2009 | Chiang |
| D606,053 | S | 12/2009 | Wu et al. |
| D607,442 | S | 1/2010 | Su et al. |
| D608,769 | S | 1/2010 | Bufe |
| D612,368 | S | 3/2010 | Yang et al. |
| 7,705,783 | B2 | 4/2010 | Rao et al. |
| 7,729,662 | B2 | 6/2010 | Abramov et al. |
| D621,819 | S | 8/2010 | Tsai et al. |
| 7,843,390 | B2 | 11/2010 | Liu |
| D633,483 | S | 3/2011 | Su et al. |
| D635,127 | S | 3/2011 | Tsai et al. |
| 7,907,971 | B2 | 3/2011 | Salo et al. |
| D635,560 | S | 4/2011 | Tsai et al. |
| D635,963 | S | 4/2011 | Podduturi |
| D635,964 | S | 4/2011 | Podduturi |
| D635,965 | S | 4/2011 | Mi et al. |
| D636,382 | S | 4/2011 | Podduturi |
| 7,965,242 | B2 | 6/2011 | Abramov et al. |
| D649,962 | S | 12/2011 | Tseng et al. |
| D651,198 | S | 12/2011 | Mi et al. |
| D654,059 | S | 2/2012 | Mi |
| D654,060 | S | 2/2012 | Ko et al. |
| D658,639 | S | 5/2012 | Huang et al. |
| D659,129 | S | 5/2012 | Mi et al. |
| D659,685 | S | 5/2012 | Huang et al. |
| D659,688 | S | 5/2012 | Huang et al. |
| 8,175,036 | B2 | 5/2012 | Visuri et al. |
| 8,184,601 | B2 | 5/2012 | Abramov et al. |
| D662,916 | S | 7/2012 | Huang et al. |
| 8,248,970 | B2 | 8/2012 | Abramov et al. |
| D671,097 | S | 11/2012 | Mi et al. |
| 8,310,402 | B2 | 11/2012 | Yang |
| D676,429 | S | 2/2013 | Gosalia et al. |
| D678,255 | S | 3/2013 | Ko et al. |
| 8,423,084 | B2 | 4/2013 | Abramov et al. |
| D684,565 | S | 6/2013 | Wei |
| D685,352 | S | 7/2013 | Wei |
| D685,772 | S | 7/2013 | Zheng et al. |
| D686,600 | S | 7/2013 | Yang |
| D689,474 | S | 9/2013 | Yang et al. |
| D692,870 | S | 11/2013 | He |
| D694,738 | S | 12/2013 | Yang |
| D695,279 | S | 12/2013 | Yang et al. |
| D695,280 | S | 12/2013 | Yang et al. |
| 8,654,030 | B1 | 2/2014 | Mercer |
| 8,669,903 | B2 | 3/2014 | Thill et al. |
| D703,195 | S | 4/2014 | Zheng |
| D703,196 | S | 4/2014 | Zheng |
| D706,247 | S | 6/2014 | Zheng et al. |
| D706,750 | S | 6/2014 | Bringuir |
| D706,751 | S | 6/2014 | Chang et al. |
| D708,602 | S | 7/2014 | Gosalia et al. |
| D709,053 | S | 7/2014 | Chang et al. |
| D710,832 | S | 8/2014 | Yang |
| D710,833 | S | 8/2014 | Zheng et al. |
| 8,854,265 | B1 | 10/2014 | Yang et al. |
| D716,775 | S | 11/2014 | Bidermann |
| 9,432,070 | B2 | 8/2016 | Mercer |
| 9,912,043 | B1 | 3/2018 | Yang |
| D818,460 | S | 5/2018 | Montgomery |
| D823,285 | S | 7/2018 | Montgomery |
| D832,241 | S | 10/2018 | He et al. |
| 10,109,918 | B2 | 10/2018 | Thill |
| 10,164,324 | B1 | 12/2018 | He et al. |
| D842,280 | S | 3/2019 | Montgomery |
| 10,305,182 | B1 | 5/2019 | Tellici |
| D857,671 | S | 8/2019 | Montgomery et al. |
| D859,371 | S | 9/2019 | Montgomery |
| D868,757 | S | 12/2019 | He et al. |
| 10,511,086 | B1 | 12/2019 | Thill |
| 10,601,124 | B1 | 3/2020 | Thill |
| 10,749,620 | B2 | 8/2020 | Thill |
| 10,868,354 | B1 | 12/2020 | He et al. |
| 10,931,325 | B2 | 2/2021 | Thill et al. |
| D921,617 | S | 6/2021 | He |
| D923,614 | S | 6/2021 | Wang et al. |
| D924,855 | S | 7/2021 | Zheng et al. |
| 11,133,589 | B2 | 9/2021 | Montgomery |
| D934,207 | S | 10/2021 | Montgomery et al. |
| 11,652,279 | B2 | 5/2023 | Wang |
| 11,757,186 | B1 * | 9/2023 | Wang .................. H01Q 21/064 343/771 |
| 2002/0003499 | A1 | 1/2002 | Kouam et al. |
| 2004/0222936 | A1 | 11/2004 | Hung et al. |
| 2005/0073462 | A1 | 4/2005 | Lin et al. |
| 2005/0190108 | A1 | 9/2005 | Lin et al. |
| 2006/0208900 | A1 | 9/2006 | Tavassoli Hozouri |
| 2007/0030203 | A1 | 2/2007 | Tsai et al. |
| 2008/0150829 | A1 | 6/2008 | Lin et al. |
| 2009/0002244 | A1 | 1/2009 | Woo |
| 2009/0058739 | A1 | 3/2009 | Konishi |
| 2009/0135072 | A1 | 5/2009 | Ke et al. |
| 2009/0262028 | A1 | 10/2009 | Mumbru et al. |
| 2010/0019979 | A1 | 1/2010 | Buxton et al. |
| 2010/0188297 | A1 | 7/2010 | Chen et al. |
| 2010/0309067 | A1 | 12/2010 | Tsou et al. |
| 2011/0006950 | A1 | 1/2011 | Park et al. |
| 2012/0013520 | A1 | 1/2012 | Hanson et al. |
| 2012/0038514 | A1 | 2/2012 | Bang |
| 2012/0229348 | A1 | 9/2012 | Chiang |
| 2012/0242546 | A1 | 9/2012 | Hu et al. |
| 2013/0222188 | A1 * | 8/2013 | Ridgeway .............. H01Q 9/285 343/700 MS |
| 2015/0022417 | A1 * | 1/2015 | Pan .......................... H01Q 9/40 343/843 |
| 2017/0054204 | A1 | 2/2017 | Changalvala et al. |

OTHER PUBLICATIONS

Ganguly Debarati et al., Cross-finned UWB monopole for wireless applications, AEU-International Journal of Electronics and Communications, Elsevier, Amsterdam, NL, vol. 116, Dec. 28, 2019.
Mazinani et al., A Novel Omnidirectional Broadband Planar Monopole Antenna With Various Loading Plate Shapes, Progress In Electromagnetics Research, Pier 97, 241-257, Jan. 1, 2009.
Wong et al., A Compact Wideband Omnidirectional Cross-Plate Monopole Antenna, Microwave and Optical Technology Letters, vol. 44, No. 6, Jan. 1, 2005.

* cited by examiner

5G ULTRA-WIDEBAND DIPOLE ANTENNA

CROSS REFERENCE TO RELATED APPLICATION

The Present Application is a continuation application of U.S. patent application Ser. No. 17/359,779, filed on Jun. 28, 2021, which claims priority to U.S. Provisional Patent Application No. 63/047,242, filed on Jul. 1, 2020, each of which is hereby incorporated by reference in tis entirety.

STATEMENT REGARDING FEDERALLY SPONSORED RESEARCH OR DEVELOPMENT

Not Applicable

BACKGROUND OF THE INVENTION

Field of the Invention

The present invention generally relates to antennas for fixed wireless, small cell or indoor coverage application.

Description of the Related Art

For an indoor 5G fixed wireless, small cell and indoor coverage system, there is a significant need to have a multi band antenna in which the antenna is either in a flat or a folded cylindrical profile. Most importantly, the antenna must have ultra-wide band performance.

A conventional single band (730-1000 MHz) dipole antenna fed in a micro-strip line is disclosed in Kitchener, U.S. Pat. No. 6,018,324 for an Omni-Directional Dipole Antenna With A Self Balancing Feed Arrangement.

Another conventional dipole antenna fed with a cable is disclosed in Ng et al., U.S. Pat. No. 9,070,966 for Multi-Band, Wide-Band Antennas. Ng et al., discloses a typical dipole antenna wherein each of two quarter-wave length conductors is based on two or more sub-quarter-wavelength conductors.

It is well known that the impedance of typical dipole antenna is around 73 ohm while the cable connected onto the dipole antenna of Ng et al., is 50 ohm. With this obvious mismatch, further increasing the matching bandwidth becomes impractical.

Further increasing the matching bandwidth requires a novel approach.

BRIEF SUMMARY OF THE INVENTION

The present invention provides an antenna assembly for multiband, actually ultra-wideband, dipole antenna fed in a unique coplanar waveguide.

One aspect of the present invention is an ultra-wide band dipole antenna assembly for transmitting or receiving electromagnetic signals comprising a dipole antenna element and coplanar waveguide feeding network.

Another aspect of the present invention is an ultra-wide band dipole antenna assembly for transmitting or receiving electromagnetic signals comprising a dipole antenna element and coplanar waveguide feeding network wherein the dipole antenna delivers the ultra-wide band matching through a pre-determined arrangement after the coplanar waveguide feeding network is applied.

Yet another aspect of the present invention is an ultra-wide band dipole antenna assembly for transmitting or receiving electromagnetic signals comprising a dipole antenna element and coplanar waveguide feeding network in a flat arrangement that delivers ultra-wide band performance with restricted width, through a pre-determined arrangement.

Yet another aspect of the present invention is an ultra-wide band dipole antenna assembly for transmitting or receiving electromagnetic signals comprising a dipole antenna element and coplanar waveguide feeding network wherein an offset of two collars extended from a second quarter conductor act not only as part of a ground plane for the ultra-wideband coplanar micro strip but also as a critical arrangement of widening matching bandwidth of the dipole antenna through close coupling between the first and second quarter wavelength conductors.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
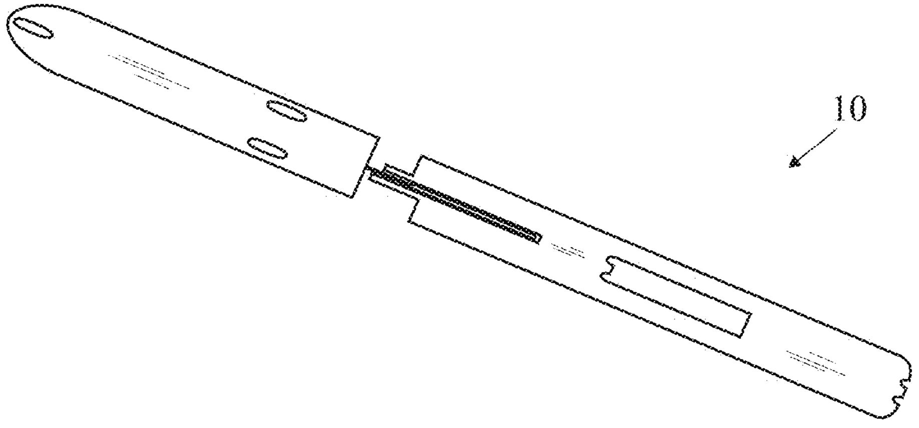
FIG. 1 is a perspective view of an ultra-wideband, dipole antenna in a flat arrangement.

The embodiments of the invention describe antenna assemblies for an ultra-wideband, dipole antenna fed in a unique coplanar waveguide.

The unique feeding network is designed such that one end of a coplanar strip line is connected onto the end of a first quarter wavelength conductor and the other end of the same coplanar strip line, together with a slot from a second quarter wavelength conductor, form the ultra-wideband feeding network at the feeding point.

Further, two collars extended from the second quarter wavelength conductor are designed not only as part of ground plane for the coplanar strip line, but also as critical arrangement for widening the matching bandwidth of dipole antenna through the close coupling between the first and second quarter wavelength conductors.

Through the pre-determined coplanar waveguide feeding network design of this dipole antenna, the initial impedance 73 Ohms of a dipole antenna has been transformed into an impedance of 50 Ohms, delivering an ultra-wideband 600-6000 MHz antenna for a 5G application. Traditional diploe antennas present a 73 Ohms impedance in certain matching bandwidths, but not in an ultra wide matching bandwidth. The coplanar waveguide feeding network provides an impedance transformation to deliver an ultra-wideband dipole antenna with an impedance of 50 Ohms. The present invention transforms the impedance of the dipole antenna to 50 Ohms while increasing the matching bandwidth by the arrangement and combination of the co-planar strip line extended from the first quarter wavelength conductor, the slot in the second quarter wavelength conductor, and the two offset collars extended from the second quarter wavelength conductor which transform the impedance to 50 Ohms and provides an ultra-wideband matching bandwidth of 617-960 MHz and 1710-6000 Mhz.

The profile of the ultra-wideband, dipole antenna can be either in a flat arrangement or a folded cylindrical arrangement.

In one embodiment, a dipole antenna with two quarter wavelength conductors delivers an ultra-wideband operating frequency range with a restricted width. Before the coplanar waveguide feeding network has been arranged, the impedance of this dipole antenna is close to 73 Ohms, for which a wideband transformer is needed. There is a slot inside the second quarter wavelength conductor, which helps widen the matching bandwidth, especially at the upper band of an operating frequency. The location, length and width of the slot is designed to widen the matching bandwidth at the upper band of a 5G operating frequency.

In a coplanar waveguide feeding network embodiment, an ultra-wide band transformer is needed to transfer the initial impedance of dipole antenna into 50 ohm.

The coplanar waveguide feeding network is designed such that one end of coplanar strip line is connected onto an end of the first quarter wave length conductor and the other end of the same coplanar strip line is the feeding point, which together with a slot from a second quarter wave length forms the ultra-wide band feeding network.

In yet another coplanar waveguide feeding embodiment, two collars extending from a second quarter conductor act not only as part of a ground plane for the ultra-wideband coplanar micro strip but also as a critical arrangement of widening a matching bandwidth of the dipole antenna through close coupling between the first and second quarter wavelength conductors.

In a restricted width dipole antenna embodiment, the ultra-wideband, dipole antenna is designed with a restricted width to meet the required ultra-wideband matching bandwidth.

Figure 4:
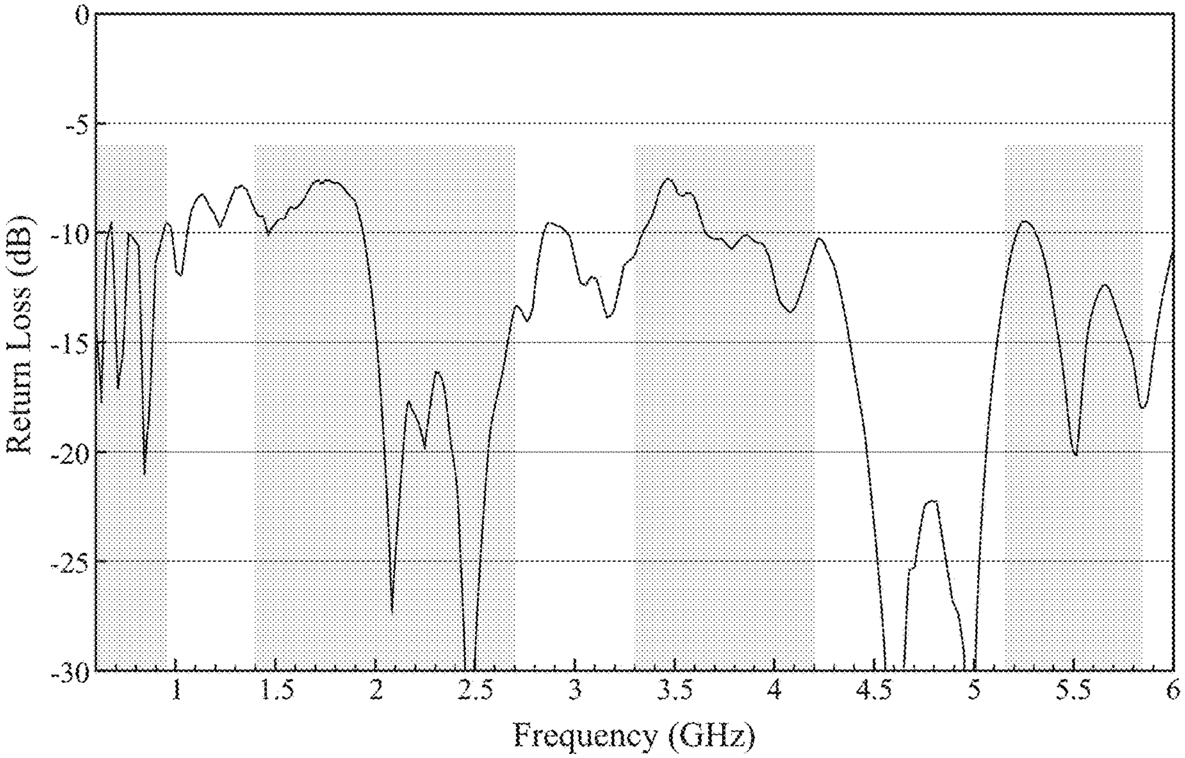
FIG. 4 is an illustration of a return loss of an ultra-wideband, dipole antenna in flat arrangement.

A flat arrangement embodiment delivers an ultra-wideband matching bandwidth as shown in FIG. 4.

In a folded cylindrical arrangement embodiment, the same antenna design and structure is folded in a cylindrical arrangement without affecting the antenna performance.

The pre-determined dimension of a dipole element and the unique coplanar waveguide feeding network are designed to maintain the ultra-wide band antenna performance when the same antenna structure is folded in the cylindrical arrangement.

When an antenna structure is folded, the two edges of a folded dipole antenna element are close which affects the overall antenna performance. Thus, the pre-determined dimension of both the dipole antenna and the coplanar waveguide feeding network are arranged to maintain the antenna performance after the flat antenna element is folded.

Figure 5:
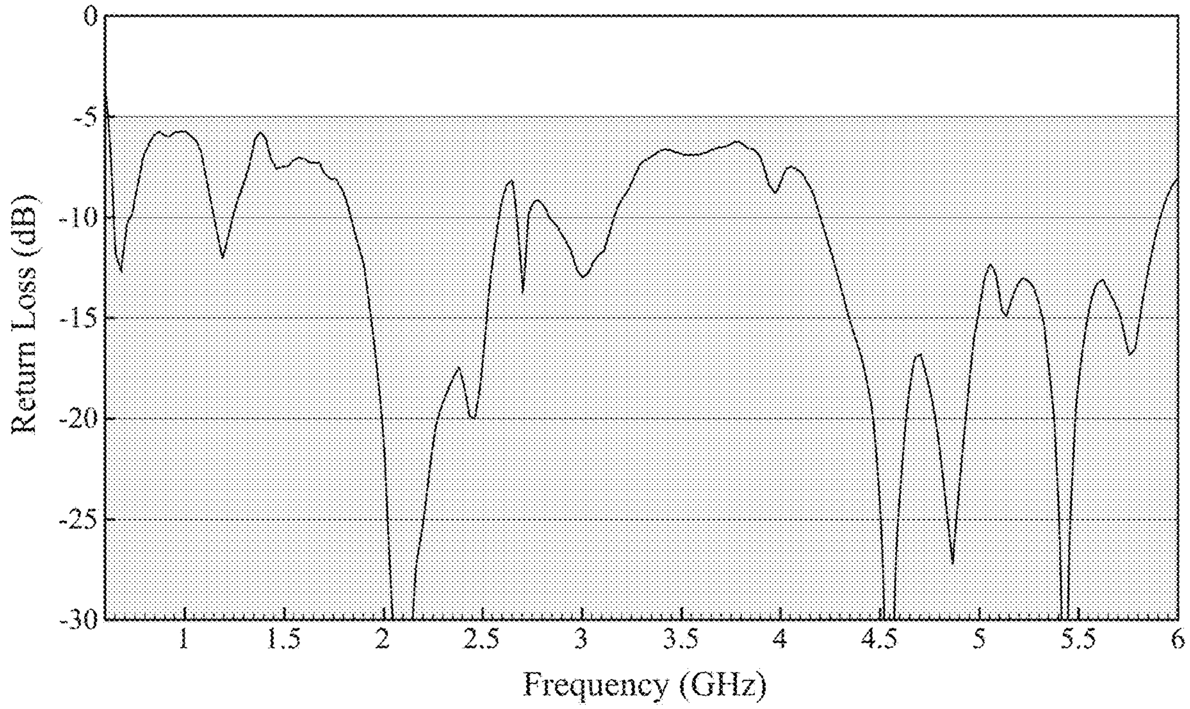
FIG. 5 is an illustration of a return loss of an ultra-wideband, dipole antenna in folded cylindrical arrangement.

The cylindrical arrangement delivers an ultra-wideband matching bandwidth as shown in FIG. 5.

In a cost-effective embodiment, the ultra-wideband, dipole antenna is a cost effective design in one piece, with the antenna element either in a flat FR4 PCB or in a folded FPC (Flexible Printed. Circuit) cylindrical arrangement. This design makes the ultra-wideband, dipole antenna very cost effective and competitive, and easy to be built.

In other versions, the ultra-wideband, dipole antenna uses materials such as LCP (Liquid Crystal Polyester), RF PCB, aluminum, brass, ceramic, LDS (Laser Direct Structuring), PDS (Printing Direct Structuring) or any metal alloy.

In a frequency embodiment, the ultra-wideband, dipole antenna is a multiband, or ultra-wide band, antenna with frequency at 600-960 MHz+1400-6000 MHz.

In another version, the ultra-wideband, dipole antenna is not limited to having an antenna operating 136-174 MHz or 380-520 MHz at the lower band, and 7 GHz and beyond at the upper band, or even further at 28 GHz band. Scaling is an effective way to apply a reference antenna design to different band applications to achieve the bands at 136-174 MHz+380-52 MHz, 7 GHz and beyond at the upper band or even further at the 28 GHz band (mmWave 5G band).

Figure 2:
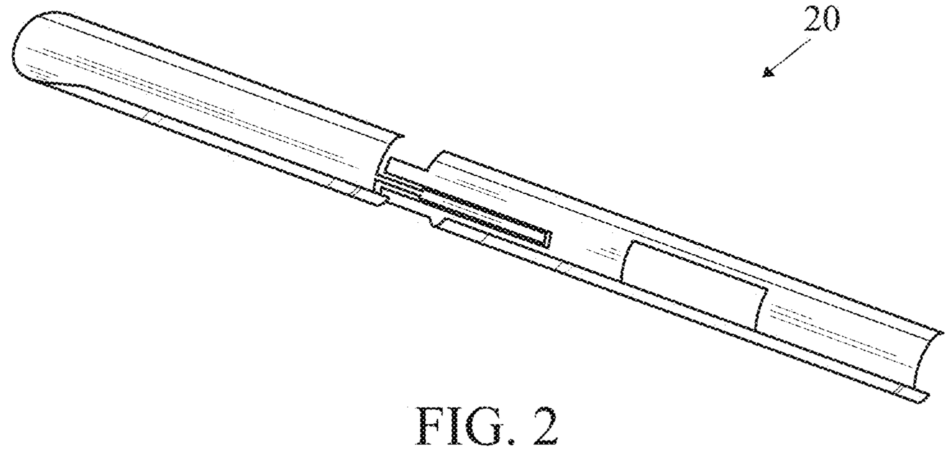
FIG. 2 is a perspective view of an ultra-wideband, dipole antenna in a folded cylindrical arrangement.
Figure 3:
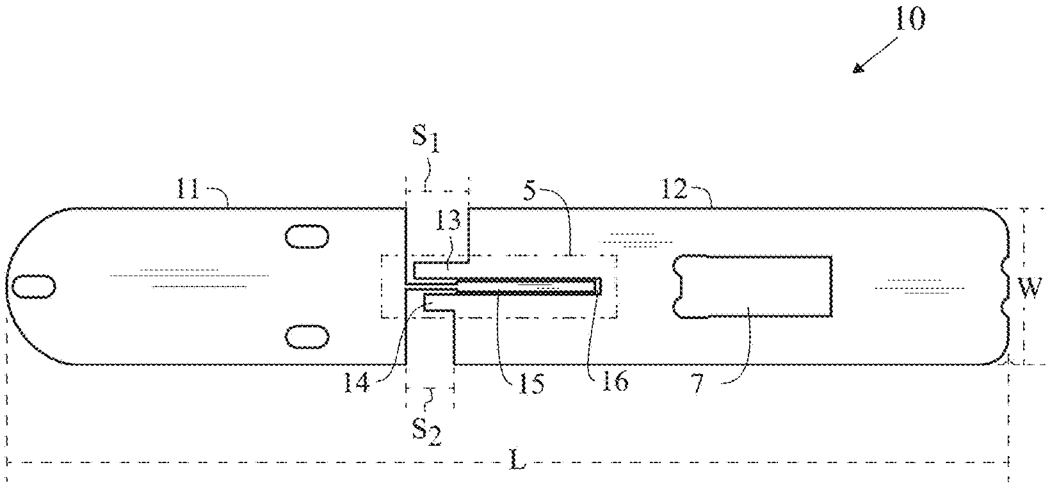
FIG. 3 is a top plan view of an ultra-wideband, dipole antenna illustrating the detailed arrangement of a novel coplanar waveguide feeding network.

As shown in FIG. 1, an ultra-wideband dipole antenna for a 5G application is generally designated 10. The antenna is designed such that it can be either in a flat rigid PCB as shown in FIG. 1, or an ultra-wideband, dipole antenna 20 folded from a flexible PCB in a slim cylinder arrangement as shown in FIG. 2. In a flat arrangement, the length is preferably 180 millimeters (mm) to 200 mm, and most preferably 190 mm. In a flat arrangement, the width is preferably 25 mm to 35 mm, and most preferably 30 mm. In a cylindrical arrangement, the length is preferably 180 millimeters (mm) to 200 mm, and most preferably 190 mm. In a cylindrical arrangement, the diameter is preferably 10 mm to 15 mm, and most preferably 15 mm.

The antenna 10 or 20 generally incudes a first quarter wavelength conductor 11 and a second quarter wave length conductor 12 with a coplanar waveguide feeding network 13 arranged such that one end of coplanar strip line 15 is connected onto the end of the first quarter wave length conductor 11 and the other end of the same coplanar strip line 15, together with a slot 16 from the second quarter wave length conductor 12, forming the ultra-wide band feeding network 5.

There are two collars 13 and 14 that extend from the second quarter conductor 12. The collars 13 and 14 are designed not only as part of a ground plane for the co-planar strip line 15, but also as a critical arrangement for widening the matching bandwidth of dipole antenna 10, through close coupling between the first quarter wavelength conductor 11 and the second quarter wavelength conductor 12.

The length of the first collar 13 is preferably 9 mm to 11 m, and most preferably 10.3 mm. Alternatively, the length of the first collar 13 is preferably 5-6% of the length of the antenna 10, and most preferably 5.4% of the length of the antenna 10. The width of the first collar 13 is preferably 2 mm to 4 mm, and most preferably 3.0 mm. Alternatively, the width of the first collar 13 is 8-12% of the width of the antenna 10, and most preferably 10% of the width of the antenna 0.

The length of the second collar 14 is preferably 5 mm to 7 m, and most preferably 5.6 mm. Alternatively, the length of the second collar 14 is preferably 2-4% of the length of the antenna 10, and most preferably 3% of the length of the antenna 10. The width of the second collar 14 is preferably 2 mm to 4 mm, and most preferably 3.0 mm. Alternatively, the width of the second collar 14 is 8-12% of the width of the antenna 10, and most preferably 10% of the width of the antenna 10.

There is a length offset between the collar 13 and the collar 14, which helps widen the matching bandwidth of this dipole antenna 10. The length of the offset is preferably from 1 mm to 3 mm, and most preferably 1.9 mm. Alternatively, the length of the offset is preferably from 0.5 to 2% of the length of the antenna 10, and most preferably 1% of the length of the antenna 10.

Also, there is a spacing offset S1 and S2 between the first quarter wavelength conductor 11 and the second quarter wavelength conductor 12, which helps widen the matching bandwidth of this dipole antenna. The length of the spacing offset S1 is preferably 10 mm to 13 m, and most preferably 11.8 mm. Alternatively, the length of the spacing offset S1 is preferably 5-7% of the length of the antenna 10, and most preferably 6.2% of the length of the antenna 10. The length of the spacing offset S2 is preferably 8 mm to 10 m, and most preferably 9 mm. Alternatively, the length of the spacing offset S2 is preferably 3-6% of the length of the antenna 10, and most preferably 4.7% of the length of the antenna 10.

Also, there is a slot 7 inside the second quarter wavelength conductor, which helps widen the matching bandwidth at the upper band. The length of the slot 7 is preferably 25 mm to 35 m, and most preferably 30 mm. Alternatively, the length of the slot 7 is preferably 13-18% of the length of the antenna 10, and most preferably 15.7% of the length of the antenna 10. The width of the slot 7 is preferably 10 mm to 12 mm, and most preferably 11 mm. Alternatively, the width of the slot 7 is 34-39% of the width of the antenna 10, and most preferably 36.7% of the width of the antenna 10.

Through the pre-determined coplanar waveguide feeding network 5 arrangement of this dipole antenna 10, the initial impedance 73 Ohms of the dipole antenna has been transformed into a 50 Ohms impedance at the feeding point, delivering ultra-wideband 600-6000 MHz for a 5G application.

In one embodiment, a dipole antenna with two quarter wavelength conductors are designed to deliver an ultra-wideband operating frequency range with a restricted width $W_1$. Before the unique coplanar waveguide feeding network 5 has been arranged, the impedance of this dipole antenna 10 is close to 73 Ohms, from which an ultra-wideband transformer is needed.

In another embodiment, this unique coplanar waveguide feeding network 5 has been arranged to transfer the initial impedance of dipole antenna into a 50 Ohms impedance.

With a restricted width (W) of the dipole antenna 10, the arrangement of the first 11 and second quarter wavelength conductor 12, together with the coplanar waveguide feeding network 5, the ultra-wideband, dipole antenna 10 is enabled to deliver the ultra-wideband matching bandwidth with the antenna structure in either flat or in folded cylindrical arrangement.

He, U.S. Pat. No. 9,362,621 for a Multi Band LTE Antenna is hereby incorporated by reference in its entirety.

Abramov et al., U.S. Pat. No. 7,215,296 for a Switch Multi-Beam Antenna Serial is hereby incorporated by reference in its entirety.

Salo et al., U.S. Pat. No. 7,907,971 for an Optimized Directional Antenna System is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 8,423,084 for a Method for radio communication in a wireless local area network and transceiving device is hereby incorporated by reference in its entirety.

Khitrik et al., U.S. Pat. No. 7,336,959 for an Information transmission method for a wireless local network is hereby incorporated by reference in its entirety.

Khitrik et al., U.S. Pat. No. 7,043,252 for an Information transmission method for a wireless local network is hereby incorporated by reference in its entirety.

Abramov et al., U.S. Pat. No. 8,184,601 for a METHOD FOR RADIO COMMUNICATION INA WIRELESS LOCAL AREA NETWORK WIRELESS LOCAL AREA NETWORK AND TRANSCEIVING DEVICE is hereby incorporated by reference in its entirety.

Abramov et al., U.S. Pat. No. 7,627,300 for a Dynamically optimized smart antenna system is hereby incorporated by reference in its entirety.

Abramov et al., U.S. Pat. No. 6,486,832 for a Direction-agile antenna system for wireless communications is hereby incorporated by reference in its entirety.

Yang, U.S. Pat. No. 8,081,123 for a COMPACT MULTI-LEVEL ANTENNA WITH PHASE SHIFT is hereby incorporated by reference in its entirety.

Nagaev et al., U.S. Pat. No. 7,292,201 for a Directional antenna system with multi-use elements is hereby incorporated by reference in its entirety.

Abramov et al., U.S. Pat. No. 7,696,948 for a Configurable directional antenna is hereby incorporated by reference in its entirety.

Abramov et al., U.S. Pat. No. 7,965,242 for a Dual-band antenna is hereby incorporated by reference in its entirety.

Abramov et al., U.S. Pat. No. 7,729,662 for a Radio communication method in a wireless local network is hereby incorporated by reference in its entirety.

Abramov et al., U.S. Pat. No. 8,248,970 for an OPTIMIZED DIRECTIONAL MIMO ANTENNA SYSTEM is hereby incorporated by reference in its entirety.

Visuri et al., U.S. Pat. No. 8,175,036 for a MULTIMEDIA WIRELESS DISTRIBUTION SYSTEMS AND METHODS is hereby incorporated by reference in its entirety.

Yang, U.S. Patent Publication Number 20110235755 for an MIMO Radio System With Antenna Signal Combiner is hereby incorporated by reference in its entirety.

Yang et al., U.S. Pat. No. 9,013,355 for an L SHAPED FEED AS PART OF A MATCHING NETWORK FOR A MICROSTRIP ANTENNA is hereby incorporated by reference in its entirety.

Thill, U.S. patent Ser. No. 10/109,918 for a Multi Element Antenna For Multiple bands Of Operation And Method Therefor, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. An ultra-wide band dipole antenna assembly for transmitting or receiving electromagnetic signals, the ultra-wide band dipole antenna assembly comprising:

a first quarter wavelength conductor element with a first end;

a second quarter wavelength conductor element comprising a main body with a first collar and a second collar extending from the main body toward the first end of the first quarter wavelength conductor element; and a coplanar strip line connected on a first end to the first quarter wavelength conductor element with a first slot between a second end of the coplanar strip line and the second quarter wavelength conductor element;

wherein the first quarter wavelength conductor element, the second quarter wavelength conductor element with first collar and second collar, and the coplanar strip line and first slot form a coplanar waveguide feeding network.

2. The ultra-wide band dipole antenna assembly according to claim 1 further comprising a second slot in the main body of the second quarter wavelength conductor element.

3. The antenna assembly according to claim 2 wherein the second slot has a length ranging from 25 mm to 35 mm and a width ranging from 10 mm to 12 mm.

4. The ultra-wide band dipole antenna assembly according to claim 1 wherein the coplanar waveguide feeding network transforms an initial impedance of 73 Ohms into a 50 Ohms impedance.

5. The ultra-wide band dipole antenna assembly according to claim 1 further comprising predetermined spacing offsets S1 and S2 between the first quarter wavelength conductor element and the second quarter wavelength conductor element configured to widen a matching bandwidth of the antenna assembly.

6. The antenna assembly according to claim 5 wherein the offset S1 has a length ranging from 10 mm to 13 m, and the offset S2 has a length ranging from 8 mm to 10 mm.

7. The ultra-wide band dipole antenna assembly according to claim 1 wherein the first collar has a greater length than the second collar.

8. The ultra-wide band dipole antenna assembly according to claim 7 wherein the first collar has a length ranging from 9 mm to 11 mm, and the second collar has a length ranging from 5 mm to 7 mm.

9. The ultra-wide band dipole antenna assembly according to claim 1 wherein the second quarter wavelength conductor element has a length greater than a length of the first quarter wavelength conductor element.

10. The antenna assembly according to claim 1 wherein the ultra-wide band dipole antenna assembly operates in a frequency band range from 600-960 MegaHertz (MHz).

11. The ultra-wide band dipole antenna assembly according to claim 10 further comprising a second slot in the main body of the second quarter wavelength conductor element.

12. The ultra-wide band dipole antenna assembly according to claim 11 wherein the second slot has a length ranging from 25 mm to 35 mm and a width ranging from 10 mm to 12 mm.

13. The ultra-wide band dipole antenna assembly according to claim 10 wherein the coplanar waveguide feeding network transforms an initial impedance of 73 Ohms into a 50 Ohms impedance.

14. The ultra-wide band dipole antenna assembly according to claim 10 further comprising predetermined spacing offsets S1 and S2 between the first quarter wavelength conductor element and the second quarter wavelength conductor element configured to widen a matching bandwidth of the antenna assembly.

15. The ultra-wide band dipole antenna assembly according to claim 14 wherein the offset S1 has a length ranging from 10 mm to 13 m, and the offset S2 has a length ranging from 8 mm to 10 mm.

16. The ultra-wide band dipole antenna assembly according to claim 10 wherein the first collar has a greater length than the second collar.

17. The ultra-wide band dipole antenna assembly according to claim 16 wherein the first collar has a length ranging from 9 mm to 11 mm, and the second collar has a length ranging from 5 mm to 7 mm.

18. The ultra-wide band dipole antenna assembly according to claim 10 wherein the second quarter wavelength conductor element has a length greater than a length of the first quarter wavelength conductor element.

19. An ultra-wide band dipole antenna assembly for transmitting or receiving electromagnetic signals, the ultra-wide band dipole antenna assembly comprising:

a first quarter wavelength conductor element with a first end;

a second quarter wavelength conductor element comprising a main body with a first collar and a second collar extending from the main body toward the first end of the first quarter wavelength conductor element; and a coplanar strip line connected on a first end to the first quarter wavelength conductor element, the coplanar strip line having a first slot;

wherein the first quarter wavelength conductor element and the second quarter wavelength conductor element are configured in a semi-cylindrical shape;

wherein the first quarter wavelength conductor element, the second quarter wavelength conductor element with first collar and second collar, and the coplanar strip line and first slot form a coplanar waveguide feeding network.

20. The ultra-wide band dipole antenna assembly according to claim 19 wherein the ultra-wide band dipole antenna assembly operates in a frequency band range from 1400-6000 MHz.

* * * * *